(No Model.) 2 Sheets—Sheet 1.
P. H. BRODESSER.
ELEVATOR.
No. 462,233. Patented Nov. 3, 1891.
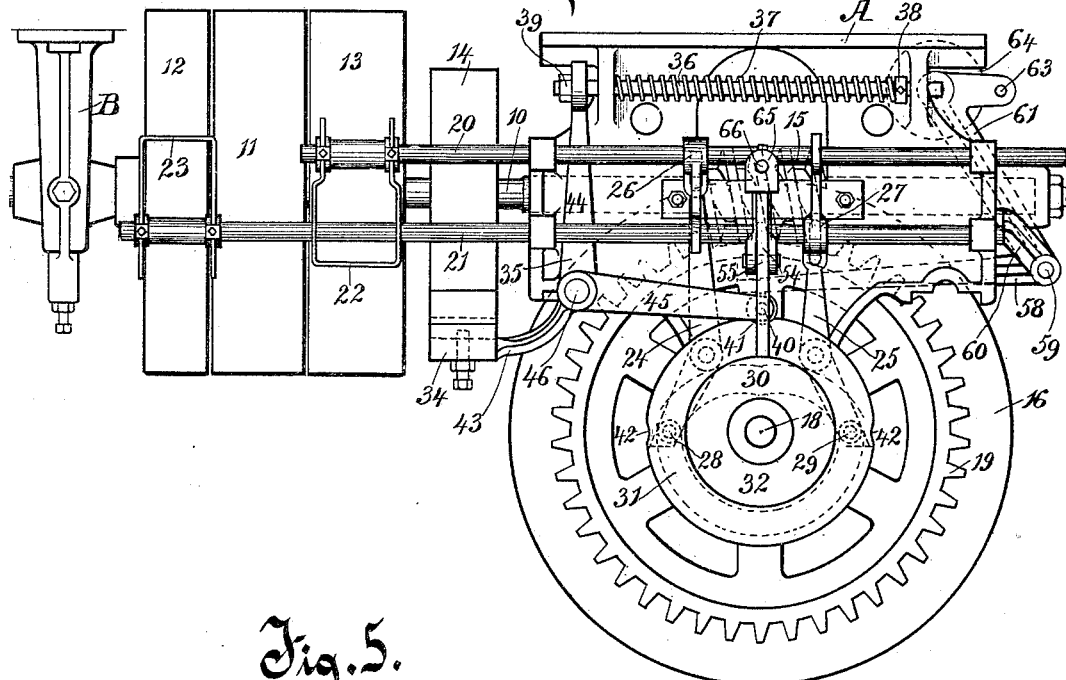
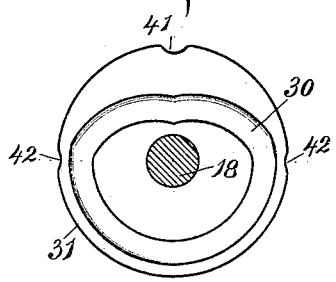
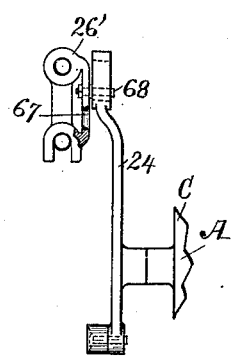
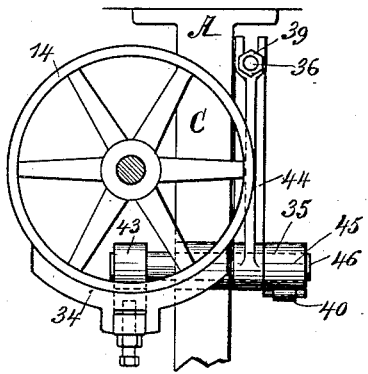
Witnesses.
O. H. Keeney,
Anna V. Faust.
Inventor.
Peter H. Brodesser
By C. T. Benedict
Attorney.

(No Model.) 2 Sheets—Sheet 2.

P. H. BRODESSER.
ELEVATOR.

No. 462,233. Patented Nov. 3, 1891.

Witnesses.
O. N. Keeney,
Anna V. Faust.

Inventor.
Peter H. Brodesser
By C. T. Benedict
Attorney.

UNITED STATES PATENT OFFICE.

PETER H. BRODESSER, OF MILWAUKEE, WISCONSIN.

ELEVATOR.

SPECIFICATION forming part of Letters Patent No. 462,233, dated November 3, 1891.

Application filed May 7, 1891. Serial No. 391,856. (No model.)

*To all whom it may concern:*

Be it known that I, PETER H. BRODESSER, of Milwaukee, in the county of Milwaukee and State of Wisconsin, have invented a new and useful Improvement in Elevators, of which the following is a description, reference being had to the accompanying drawings, which are a part of this specification.

My invention relates to improvements in that class of elevators in which a screw and worm gear is used to communicate motion to the winding-drum.

The object of the invention is to provide means for adjusting parts of the machine to each other, for facilitating the operation of the mechanism, and for increasing the capacity of the elevator and at the same time strengthen and improve the construction of the device in many of its parts.

Figure 2:
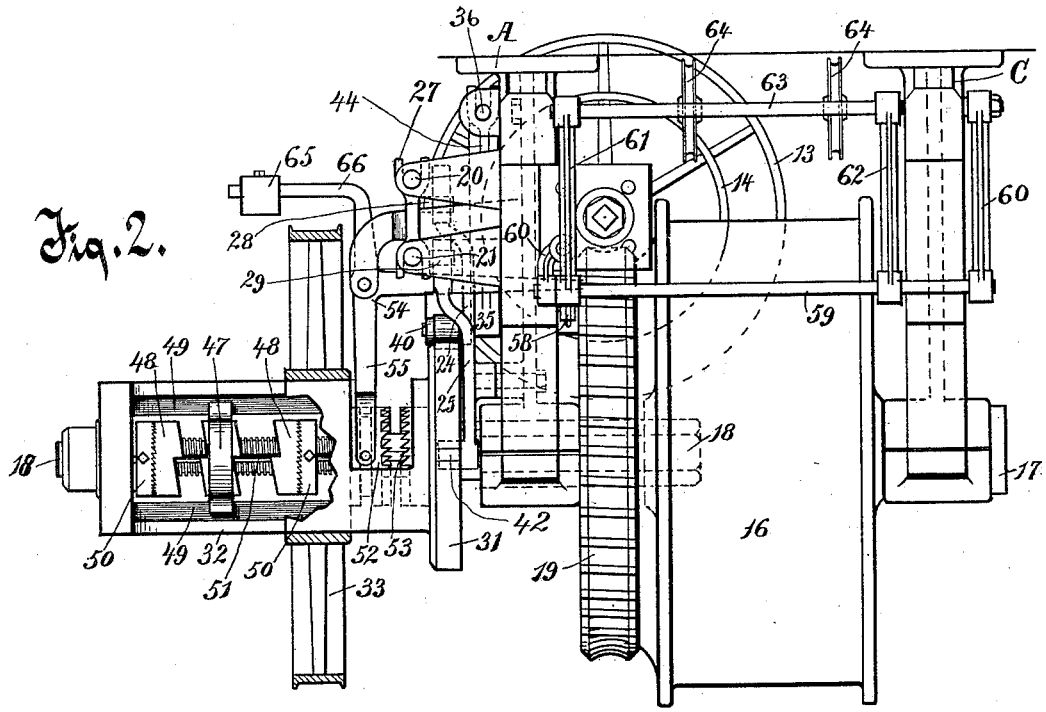
Figure 3:
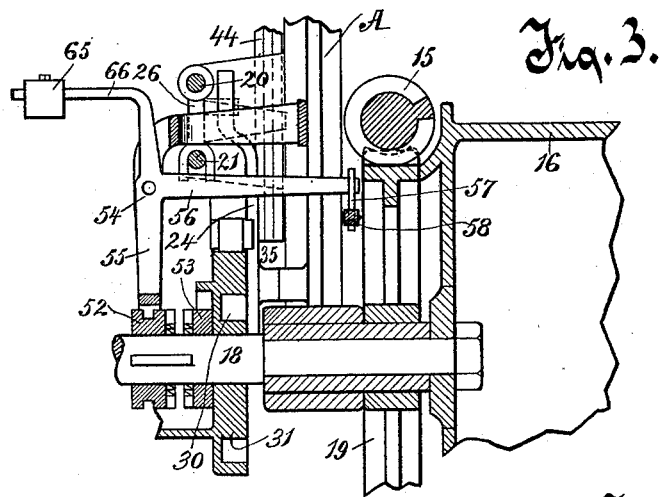

In the drawings, Figure 1 is a side elevation of the machine, the starting-wheel being omitted to exhibit other parts more completely. Fig. 2 is an elevation at right angles to Fig. 1, parts being in section to show interior construction. Fig. 3 is a detail, mostly in section, of parts of the mechanism partially shown in Fig. 2. Fig. 4 is an end view of the brake and brake-wheel with allied parts of the mechanism. Fig. 5 is an end view of a cam rigid to the starting-wheel and supported movably on the shaft or gudgeon of the drum and is adapted for shifting the driving-belts. Fig. 6 is a modified form of a portion of the belt-shifting mechanism.

The frame or hangers A, B, and C are of suitable form for supporting the operative mechanism, and in use are severally affixed to and depend from suitable supports therefor. A driving-shaft 10 has its bearings in the frame A and in the hanger B. This shaft carries the tight pulley 11, loose pulleys 12 and 13, the brake-wheel 14, and the screw 15. The cable-drum 16, having its axis at right angles to the driving-shaft 10, is provided with gudgeons or journals 17 and 18, having their bearings respectively in the hangers C and A. The drum 16 is also provided with a worm-gear 19, meshing with the screw 15 on the shaft 10, whereby motion is communicated to the drum from the driving-shaft. A cable or preferably two cables (not shown in the drawings) are secured at one end to and wind upon the drum 16, and therefrom run upwardly at the right of the drum in Fig. 1 to and over suitable idle wheels or pulleys, and therefrom to the elevator platform or car which is supported thereon.

For raising and lowering the elevator-car the driving-belts run in opposite directions, and are so arranged that by shifting the belt that runs loose on the pulley 13 onto the tight pulley 11 the car will be elevated, and instead thereof by shifting the belt that runs on pulley 12 onto the pulley 11 the car will be lowered. For conveniently shifting the belts rods 20 21 are supported movably endwise in the frame A and are severally provided with looped arms 22 23, secured adjustably to the rods 20 and 21, respectively, through which loops the driving-belts run, and by the movement of which rods endwise the belts are respectively shifted onto or off of the tight pulley 11. For shifting these rods 20 and 21 endwise levers 24 25 are pivoted medially on the hanger A, which levers at their upper ends are pivoted to arms 26 and 27, respectively, which arms are secured adjustably, respectively, to the rods 20 and 21. These arms 26 and 27 extend from the rod to which they are severally secured to the other rod, and are provided with a recess, in which the other rod, respectively, is received movably. The levers 24 and 25 are secured to the arms 26 and 27 by bolts which pass through slots therefor in the levers 24 and 25 to provide for the slight oscillatory movement of the levers on the arms. At their lower extremities the levers 24 and 25 are provided with pins 28 and 29, respectively, which travel in a crown cam or eccentric 30 in a wheel 31, that forms the end of a drum-frame 32. This drum-frame 32 is carried loose on the outwardly-projecting gudgeon or journal 18 of the cable-drum 16. A shifting pulley 33 is rigid on the drum-frame 32. In use a hand-rope is secured to this wheel, running over its periphery on both sides, and runs down into the elevator-well through the car, being thus arranged and adapted for enabling the operator while in the car to shift the belts onto or from the pulley 11, and thus control the movement of the car. It will be seen that by rotating the shifting pulley 33 one or the other of the pins 28 or 29 will travel in the eccentric in wheel 31 near to its axis, thus tilting the lever and shifting the rod 20 or 21 and the corresponding belt.

A spring-actuated brake 34 is arranged to bear against the wheel 14 and lock the mechanism when the belts are running on the loose pulleys 12 and 13. The brake 34 is secured adjustably on the arm 43 of a three-armed bell-crank 35, which is pivoted at its angle on the frame A. One arm 44 of this crank extends upwardly and is connected to a rod 36, movable endwise in the frame A. A spring 37 about the rod 36, interposed between a bearing on the frame A and an adjustable collar 38 on the rod 36, is adapted to hold the brake 34 normally but yieldingly against the wheel 14. The rod 36 is pivoted or connected movably to the arm of the bell-crank conveniently by passing through a slot or recess in the arm, being provided with a nut 39, turning on its outer end against the arm of the bell-crank, thus holding it up to its work. The other or third arm 45 of the bell-crank is provided with a pin 40, having an anti-friction sleeve, which rides on the periphery of the wheel 31 and is arranged to hold the brake 34 away from the wheel 14, except when the pin 40 drops into the depression or socket 41 in the wheel 31. This socket is so located on the wheel, and the various parts of the mechanism are so arranged that the brake will engage the wheel 14 when the belts are shifted onto the loose pulleys 12 and 13, respectively. At other times the brake is held out of engagement with the wheel 14. Slight sockets 42 42 in the periphery of the wheel 31 are arranged to receive the pin 40 therein and thereby steady the mechanism, though the sockets are not sufficiently deep to allow of such tilting of the bell-crank as to put the brake in engagement with its wheel. The bell-crank 35 includes the arm 43, to which the brake is secured, the arm 44, connected to the rod 36, the arm 45, in which the pin 40 is fixed, and the short shaft 46, journaled in the frame and to which the several arms are secured.

I provide devices for automatically stopping the mechanism of the elevator when the car has reached the limit up and down of its travel, which devices consist of a traveling clutch-nut 47 and adjustable complementary clutch-collars 48. The clutch-nut 47 travels by its screw-thread on a screw-threaded part of the gudgeon 18 and is held against rotation by longitudinal ways 49 on the drum-frame 32, against which ways projections on the clutch-nut bear movably. The clutch-collars 48 turn by screw-thread on the gudgeon 18, whereby they are adjustable to proper positions thereon to arrest the motion of the mechanism at the limit of the travel of the car. These clutch-collars 48 are preferably secured to the gudgeon 18 by means of the collars 50 about and secured adjustably to the gudgeon 18 by means of set-screws turning through them into a longitudinal channel 51 in the gudgeon. The clutch-nuts are arranged to engage the collars 50 by means of serrations or teeth on the respective collars therefor. It will be understood that as the drum 16 revolves the nut 47 travels on the gudgeon until it engages one or the other of the collars 48, and thereupon the drum-frame 32 is rotated limitedly, shifting the belt from the pulley 11 onto its loose pulley in the manner hereinbefore described.

It sometimes occurs that the car when descending is blocked in the well and stops temporarily or permanently, while the elevator mechanism runs on, thus temporarily deranging the parts, and if the blocking of the car in the well is only temporary, resulting, on the limited or considerable fall of the car when released, in a great shock or strain on the mechanism. To obviate this I provide automatic devices for stopping the elevator mechanism whenever the strain on the car-supporting cable is released. For this purpose a clutch-collar 52, splined on a smooth portion of the gudgeon 18, is arranged (in the emergency referred to) to be thrown into engagement with the clutch 53, rigid on the drum-frame 32, whereby when so in engagement the drum-frame will be rotated limitedly by the rotation of the drum 16 and the belt will be shifted from the fixed pulley 11 and the brake set on the elevator mechanism in the manner hereinbefore described. For operating the clutch-collar 52 a three-armed bell-crank 54, pivoted on a bracket affixed to the hanger C, is provided, the bifurcated extremities of one arm 55 of which ride in a groove therefor in the periphery of the clutch-collar 52, and another arm 56 is connected by a link 57 to an arm 58 of another bell-crank, which other bell-crank is pivoted at its angle on a rod 59, journaled in brackets 60, secured rigidly to the hangers. A rod 63 is fixed in the outer ends of two arms 61 and 62, the arm 61 being a part of the bell-crank, of which the arm 58 forms a portion, the arm 62 being rigid on the rod 59 and parallel with the arm 61. Two grooved pulleys 64 are loose on the rod 63 and are arranged above and normally a little in front of the front portion of the periphery of the drum 16 in such manner that the car-cables running upwardly from the drum run on the pulleys 64, and when the cables are taut force the pulleys and rod 63 rearwardly, thereby forcing the arms 58 and 56 downwardly, holding the clutch-collar 52 away from the clutch 53; but if the cables for any reason become slack, so as not to bear against the pulleys 64, a weight 65, adjustable on the arm 66 of the three-armed bell-crank 54, tilts the bell-crank and forces the clutch-collar 52 into engagement with the clutch 53, whereby by the revolution of the drum 16 the drum-frame 32 will be revolved limitedly and the belt will be shifted from the tight pulley 11, as hereinbefore described.

In the modified form shown in Fig. 6 the arm 26' is provided with a slot 67, in which the pin 68 is secured adjustably, on which pin the lever 24 is pivoted.

What I claim as new, and desire to secure by Letters Patent, is—

1. In elevator mechanism, the combination, with the winding-drum and a rigid gudgeon projecting therefrom, of a drum-frame loose on the gudgeon, which drum-frame carries a shifting pulley and is provided with a cam in its head, and suitable levers actuated by the cam and connected with and adapted to shift the belts on the driving-pulleys, substantially as described.

2. The combination, with a winding-drum and a rigid gudgeon projecting therefrom, of a drum-frame loose on the gudgeon, which drum-frame is provided with a cam-actuating lever connected with and adapted to shift the driving-belts, and a clutch-nut traveling by screw-thread on the gudgeon and longitudinally on ways therefor on the drum-frame, and clutch-collars secured to the gudgeon at a distance from each other, between which the clutch-nut is adapted to travel and with which it is adapted to engage, substantially as described.

3. In automatic elevator-stopping mechanism, the combination, with a winding-drum, a fixed gudgeon thereon, and a drum-frame loose on the gudgeon, of a clutch-nut turning by screw-thread on the gudgeon and bearing movably longitudinally against ways therefor in the drum-frame, and clutches adjustable on the gudgeon at varying distances apart, between which the clutch-nut is adapted to travel and with which it is adapted to engage, substantially as described.

4. In automatic elevator-stopping mechanism, the combination, with a winding-drum, a fixed gudgeon thereon, and a drum-frame loose on the gudgeon, of a clutch-nut turning by a screw-thread on the gudgeon and bearing movably longitudinally against ways therefor in the drum-frame, clutches on both sides of the clutch-nut and having teeth or lugs arranged to engage corresponding teeth or lugs on the clutch-nut, which clutches are adjustable toward and from each other by a screw-thread on the gudgeon on which they travel, and collars on the gudgeon outside the clutches, which collars are adjustable on the gudgeon toward and from each other and are secured to the gudgeon by set-screws turning against the gudgeon in a longitudinal groove therefor, the collars being provided with teeth on their inner ends adapted to engage in one direction corresponding teeth on the clutches, substantially as described.

5. In elevator mechanism, the combination, with parallel endwise-moving belt-shifting rods, of arms, as 26 27, secured rigidly, respectively, to each of the rods and extending from the rod to which it is secured to the other rod and provided with a recess in which the other rod is received movably, whereby the parts are steadied and guided, and cam-actuated levers pivoted on the frame and connected pivotally to the arms 26 and 27, respectively, substantially as described.

6. In elevator mechanism, the combination, with a cam-actuated lever, as 24, and a belt-shifting rod, as 20, of an arm, as 26', and therein a slot 67 and an adjustable pin 68, on which the arm 24 is pivoted, substantially as described.

7. In elevator mechanism, the combination, with a winding-drum and a gudgeon fixed therein, of a wheel, as 31, loose on the gudgeon, which wheel has a lever-actuating cam in its face, and a brake-actuating bell-crank, one arm of which by its wrist rides on the periphery of the wheel 31 and enters a socket therein in a predetermined position of the wheel, substantially as described.

8. In elevator mechanism, the combination, with a winding-drum and a gudgeon fixed therein, of a wheel, as 31, loose on the gudgeon, and a greater socket or cam, as 41, and lesser sockets, as 42, at a distance therefrom in the periphery of the wheel, and a brake-actuating bell-crank, one arm of which bears on the wheel 31 and is released actively by dropping into the greater socket and steadied but not released by dropping into the lesser sockets, substantially as described.

9. In an elevator, an automatic device for shifting the driving-belt, comprising a cable-actuated bell-crank, a weight-actuated bell-crank connected to and supported normally by the cable-actuated bell-crank, and a clutch controlled by the weight-actuated bell-crank, which clutch is splined on the gudgeon of the winding-drum and is arranged, when shifted by the weight-actuated bell-crank, to engage the belt-shifting mechanism and shift the belt, substantially as described.

10. The combination, with a winding-drum, a gudgeon fixed thereto, and a drum-frame adapted to operate the belt-shifting mechanism, of a clutch-collar, as 52, splined on the gudgeon, a weight-actuated bell-crank 54, connected to and actuating a bell-crank having arms 58 and 61, and pulleys, as 64, loose on a rod 63, which is substantially the wrist of the arm 61, which pulleys 64 are arranged above and normally slightly in front of the winding-drum and adapted to be forced rearwardly by the taut car-cables running upwardly from the winding-drum, substantially as described.

In testimony whereof I affix my signature in presence of two witnesses.

PETER H. BRODESSER.

Witnesses:
C. T. BENEDICT,
C. H. KEENEY.